Oct. 18, 1960 H. KIHN 2,957,043

SCANNING SYSTEM FOR CATHODE RAY TUBES

Filed March 28, 1958

INVENTOR.
HARRY KIHN

BY Wade Koontz and George Fine

ATTORNEYS

United States Patent Office 2,957,043

Patented Oct. 18, 1960

2,957,043

SCANNING SYSTEM FOR CATHODE RAY TUBES

Harry Kihn, Lawrenceville, N.J., assignor to the United States of America as represented by the Secretary of the Air Force Filed Mar. 28, 1958, Ser. No. 724,782

3 Claims. (Cl. 178—7.5)

The present invention relates to a system for blanking the return trace of a cathode ray tube and more particularly to a system incorporating a local oscillator which is selectively controlled by blanking pulses thereby preventing noise or signals from appearing on the cathode ray tube during the retrace period.

The usual scanning system utilized in a television receiver provides means for moving a spot horizontally across the screen of a cathode ray tube. It is then moved back quickly and allowed to begin its next horizontal sweep. During the fly-back time, commonly referred to as the retrace period, a negative voltage is put on the signal grid of the cathode ray tube in order to cut off or blank the beam preventing the fly-back path from becoming visible. The spot is simultaneously caused to move slowly in a vertical direction. It is therefore common to provide horizontal and vertical blanking pulses for the cathode ray tube.

Often disturbances are generated during the return time of the moving beam of a cathode ray tube. This disturbance is reflected upon the face of the cathode ray tube by its illumination during periods of such disturbance. To minimize the effects of these disturbances, blanking pulses have been utilized in the past. The blanking pulses have been injected into the electrodes of the cathode ray tube as a control voltage so that during the retrace period the electron emission was reduced. However because of stray capacities and leakage, R.F. noise may appear in the picture even though the reading beam of the cathode ray tube is cut off or minimized by means of the control voltages supplied by the blanking pulses to the control electrodes of said cathode ray tube.

The present invention provides a system for blanking the return trace of a cathode ray tube so that any disturbance particularly that originating in the R.F. section of the television receiver is effectively eliminated in the picture presented upon the face of the cathode ray tube. Such a system has incorporated in the television receiver a local oscillator that injects a signal into a mixer, the mixer simultaneously receives an R.F. incoming signal. During periods of the return trace, the local oscillator is cut-off, thereby preventing any signals passing through the video amplifier, thus achieving a complete blanking of the cathode ray tube.

An object of the present invention is to provide a system for blanking the return trace of a scanning current or voltage of a cathode ray tube incorporated in a television receiver.

Another object of the present invention is to provide a system for blanking the return trace of a scanning current or voltage of a cathode ray tube by selectively controlling the operation of an injection oscillator.

A further object of this invention is to provide a system for blanking the return trace of a scanning current or voltage by blanking the picture appearing upon the face of a cathode ray tube.

The invention will be more readily understood by referring to the following description taken in connection with the accompanying drawings forming a part thereof in which.

Figure 1:
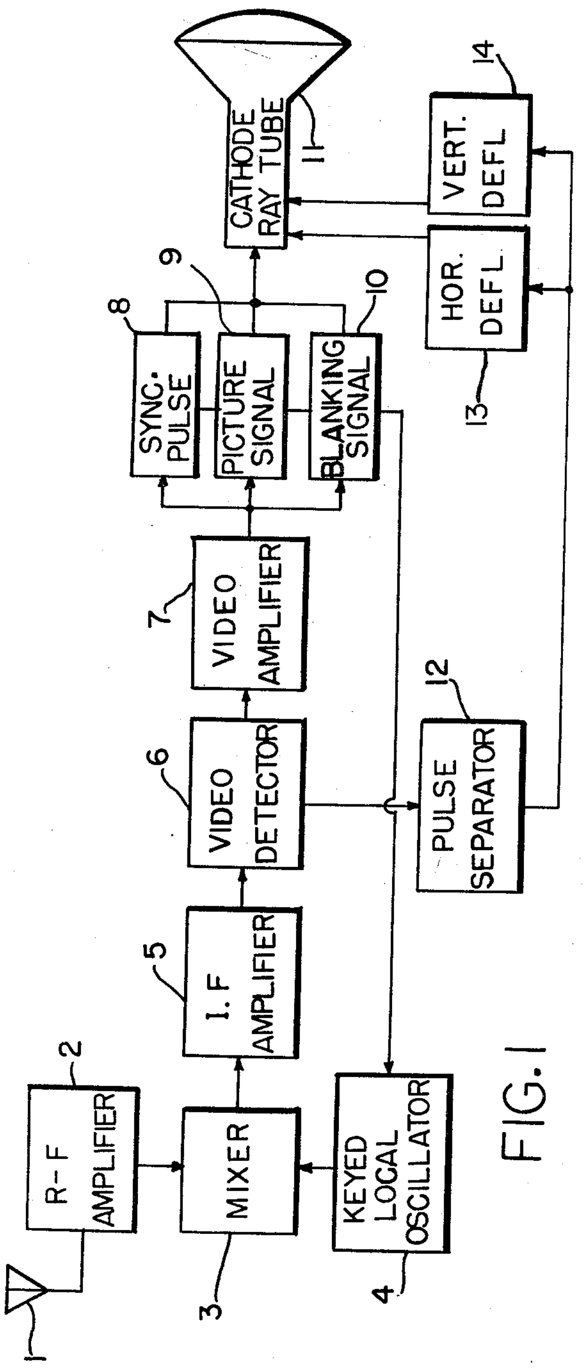
Fig. 1 is a block diagram of a system to provide blanking of a cathode ray tube during the period of the return trace of the scanning beam.

Referring more particularly to the drawings, Fig. 1 shows antenna 1 which receives an incoming television signal. The television signal is fed to R.F. amplifier 2. A heterodyning signal is generated in local oscillator 4. The amplified television signal from R.F. amplifier 2 and the heterodyne signal from local oscillator 4 are fed into mixer 3 simultaneously. I.F. signals are derived from mixer 3 which are fed into I.F. amplifier 5. The I.F. signals are detected in video detector 6. The detector signal simultaneously is fed to video amplifier 7 and pulse separator 12. Pulse separator 12 supplies the requisite control signals to horizontal deflection circuit 13 and vertical deflection circuit 14 thereby providing cathode ray tube with the requisite scanning beam.

The signal from video amplifier 7 is fed simultaneously to sync-pulse circuit 8, picture signal circuit 9 and blanking signal circuit 10.

The output signals from sync-pulse circuit 8 and from picture signal circuit 9 are fed into the grid control electrodes of cathode ray tube 11 to provide the necessary informational signal to recreate a picture when the scanning beam is deflected by aforesaid horizontal and vertical deflection circuits.

The visual scanning system of a television receiver requires that when operation of the horizontal circuit 13 moves a scanning spot horizontally across the screen of cathode ray tube 11, that it is then moved back quickly and allowed to begin its next horizontal sweep. During the fly-back time (retrace period) it is desirable to blank the screen so that no illumination will appear on the face of the cathode ray tube.

The fly-back spot is simultaneously caused to move slowly in the vertical direction by vertical deflection circuit 14.

Blanking circuit 10 provides pulsed signals whose leading edge starts at the time the scanning spot of cathode ray tube 11 starts its horizontal or vertical retrace. The time duration of the pulse is equivalent to the period of the horizontal or vertical fly-back time. (These blanking pulses are the ones conventionaly utilized in television receiver.) The blanking pulses are fed to keyed local oscillator 4. Normally, oscillator 4 is operative, each of blanking pulses from circuit 10 will discontinue the oscillations from oscillator 4 for the period of the pulse.

When keyed local oscillator 4 is cut-off by blanking pulses, there is no heterodyning in mixer 3 with any incoming signal provided by way of R.F. amplifier 2. Therefore, any disturbances present because of stray capacities and leakage in the R.F. section are prevented from being passed to I.F. amplifier 5 and from there to cathode ray tube 11. In essence, the entire picture is blanked for the retrace period.

Figure 2:
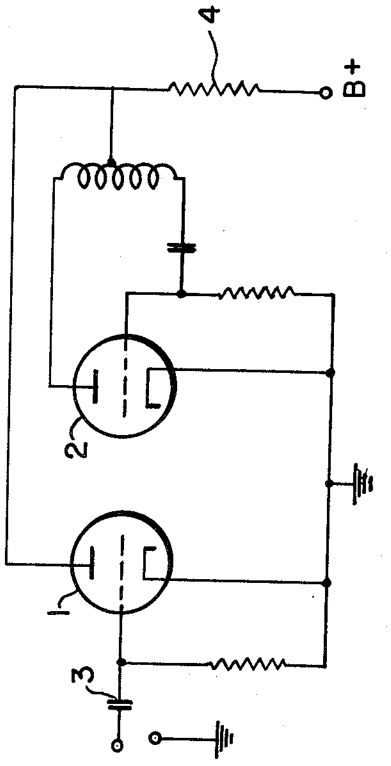
Fig. 2 is a circuit diagram of a keyed oscillator selectively controlled by blanking signals.

Means for keying an oscillator which is utilized in Fig. 1 is illustrated in circuit of Fig. 2 wherein the circuit incorporating electron device 2 is a series fed Hartley oscillator. The oscillator is adjusted to be normally operative.

The circuit incorporating electron discharge device 1 is normally non-conductive. When terminal 3 receives a blanking pulse, it is fed to the control grid of electron discharge device 1. The pulse operates so as to make electron discharge device conductive for the period of the pulse. When conduction occurs, more current is drawn by resistor 4 thereby causing a voltage drop across it. The voltage drop across the resistor is such that the anode voltage of electron discharge device 2 is lowered and as a result, the circuit incorporating electron discharge device 2 stops oscillating for the period of the blanking pulse. In effect the oscillator is switched off by reducing its plate voltage.

Although the present invention has been described in terms of one illustrative embodiment it should be realized that the invention and its several features are susceptible of embodiment in a wide variety of other forms. Hence the invention is to be understood as comprehending such other forms as may fairly come within the spirit and letter of the appended claims.

What is claimed is:

1. In a scanning system for a television receiver including a cathode ray tube, means to generate a local oscillator signal, a mixer adapted to receive simultaneously both a R.F. television signal and said local oscillator signal, said mixer operating to produce a resultant signal for amplification in an intermediate frequency signal channel, video detector means receiving the output of said intermediate frequency signal channel, means for scanning said cathode ray tube horizontally and vertically, said scanning means including a pair of deflection voltage supplying means for delivering horizontal and vertical deflection voltages, respectively, to said cathode ray tube, means for feeding to said voltage supplying means a series of pulse signals derived from said video detector means, means to generate horizontal and vertical blanking pulses during each of the retrace periods of said horizontal and vertical scans, said blanking means controlled by the output signal from said video detector means, and means to deliver to said local oscillator means a cycle-controlling impulse on each cycle of operation of said blanking pulse generating means, to cause said local oscillator means to be switched off during each of said blanking pulse generating periods.

2. In a scanning system for a television receiver including a cathode ray tube, a mixer adapted to receive simultaneously both a R.F. television signal and a fixed frequency signal generated in a normally operative local oscillator, said mixer operating to produce a resultant signal for amplification in an intermediate frequency signal channel, video detector means receiving the output of said intermediate frequency signal channel, means for scanning said cathode ray tube horizontally and vertically, said scanning means including a pair of deflection voltage supplying means for delivering horizontal and vertical deflecting voltages, respectively, to said cathode ray tube, means for feeding to said voltage supplying means a series of pulse signals derived from said video detector means, means to generate horizontal and vertical blanking pulses during each of the retrace periods of said horizontal and vertical scans, said blanking means controlled by the output signal from said video detector means, and means to switch off said normally operative local oscillator during each of said horizontal and vertical retrace periods, said switching means being responsive to said horizontal and vertical blanking pulses.

3. In a scanning system for a television receiver including a cathode ray tube, a mixer adapted to receive simultaneously both a R.F. television signal and a fixed frequency signal generated in a normally operative oscillator, said mixer operating to produce a resultant signal for amplification in an intermediate frequency signal channel, video detector means receiving the output of said intermediate frequency signal channel, means for scanning said cathode ray tube horizontally and vertically, said scanning means including a pair of deflection voltage supplying means for delivering horizontal and vertical deflection voltages, respectively, to said cathode ray tube, and means for feeding to said voltage supplying means a series of pulses derived from said video detector means, means to generate horizontal and vertical blanking pulses during each of the retrace periods of said horizontal and vertical scans, said blanking means controlled by the output signal from said video detector means, and means to switch off said resultant signal during said retrace periods, said switching means including means to deliver to said local oscillator a cycle-controlling impulse on each cycle of operation of said blanking pulse generating means, to cause said local oscillater to be switched off during each of said blanking pulse generating periods.

References Cited in the file of this patent

UNITED STATES PATENTS

| | | |
|---|---|---|
| 2,215,285 | Ballard | Sept. 17, 1940 |
| 2,285,043 | Messner | June 2, 1942 |
| 2,346,499 | McCollum | Apr. 11, 1944 |
| 2,602,834 | Leslie | July 8, 1952 |
| 2,607,847 | Heisig | Aug. 19, 1952 |